United States Patent [19] [11] 3,857,087
Jones [45] Dec. 24, 1974

[54] LEAD-ACID BATTERY TEST METHOD
[75] Inventor: David C. Jones, Austin, Tex.
[73] Assignee: Ford Motor Company, Dearborn, Mich.
[22] Filed: Apr. 12, 1973
[21] Appl. No.: 350,434

[52] U.S. Cl.................... 324/29.5, 320/48, 320/14
[51] Int. Cl........................ G01n 27/42, H02j 7/00
[58] Field of Search ................ 324/29.5; 320/48, 14

[56] References Cited
UNITED STATES PATENTS
| | | | |
|---|---|---|---|
| 2,864,055 | 12/1958 | Kordesch et al................... | 324/29.5 |
| 3,392,328 | 7/1968 | Figg................................. | 324/29.5 |
| 3,500,167 | 3/1970 | Applegate et al..................... | 320/14 |
| 3,593,099 | 7/1971 | Scholl............................. | 324/29.5 X |
| 3,680,072 | 7/1972 | Charbonnier et al............... | 340/249 |

Primary Examiner—Alfred E. Smith
Assistant Examiner—Rolf Hille
Attorney, Agent, or Firm—Joseph A. Malleck; Keith L. Zerschling

[57] ABSTRACT

A method is disclosed for testing a lead-acid battery using both transient discharging and transient charging separated by a period of time to allow the battery to recover from either ion depletion or ion adsorption. The transient charging is carried out to determine the current required to obtain a predetermined level of polarization of the battery electrodes and the transient discharging is carried out to obtain a detectable polarization (voltage change due to current flow). True measurement values for transient current and polarization are obtained and such values are compared against reference values to determine battery quality.

7 Claims, 6 Drawing Figures

LEAD-ACID BATTERY TEST METHOD

BACKGROUND OF THE INVENTION

Classical techniques of testing lead acid batteries frequently consist of comparing the physical properties of the individual cells, such as cell voltage or specific gravity. The advent of through-the-cell-wall connectors and maintenance-free batteries makes such techniques obsolete. Thus, a battery tester based on purely electrical measurements at the battery posts will be required. Attempts have been made by the prior art to provide such electrical measurement devices or methods; none have been successful because the required combination of accuracy, simplicity, ruggedness and low cost have not been achieved. These attempts have usually been based on voltage measurements, or on some function of charging current, discharging current, and time. Interpretation of such measurements have been based on comparing results to those obtained by testing large numbers of batteries of known quality, rather than trying to relate the measured parameters to specific battery properties.

The techniques and method disclosed herein represent a departure from these attempts. It has been confirmed, as part of the inventive investigation, that electrical double-layer capacitance of a battery electrode arises in response to an electrical pulse; the double-layer capacitance depends upon many inherent and environmental properties of the electrode and is sensitive to the actual exposed surface area of the electrode, to the micro-structure of the electrode, to any reaction-product layer on the electrode, to the potential of the electrode, and to many of the chemical species which might be present in the environment (electrolyte). However, it has become apparent, through continuing investigation, that direct measurement of electrical double-layer capacitance is impractical since it requires three electrodes. With this in mind, the method and apparatus of this invention has turned to the measurement of current transients occuring when a two electrode system is pulsed. Such current transients vary with the state of charge of the electrode and are sensitive to the properties of both the lead and the lead dioxide electrodes. These measurements have proved to be sensitive to all the properties which affect double-layer capacitance: active surface area, metal structure, solution composition, reaction-product layers on metal surfaces, and electrode potential.

Another important parameter investigated and now forming part of this inventive method is electrode polarization. Polarization, as used herein, is a voltage change in the electrode brought about by a given current passing through the lead-acid interface. Both polarization and transient current measurements have been found necessary to obtain a simple, economical method and direct reading device which will fully determine defective batteries.

SUMMARY OF THE INVENTION

It is a primary object of this invention to employ, in a unique manner, the combined measurement of polarization and transient current for a lead-acid battery to determine battery quality.

Another object is to provide a method of testing batteries which separates good charged batteries from good discharged batteries or bad batteries on the basis of polarization resulting from a discharge; separation of discharged good batteries from defective batteries is then obtained by determining the transient current necessary to obtain a predetermined level of polarization for the batteries under test, the defective batteries having a lower current transient. This is because more polarization mechanisms exist for a bad battery than for a good battery. Therefore, less current is required to accomplish a given level of polarization in a bad battery than in a good discharged battery.

The prior art used the concept of voltage measurement during discharge to differentiate between good, fully charged batteries and batteries that are bad or are discharged. This so-called "discharge test" is the basis for several testers currently on the market. However, the instant invention (using not only discharging but also charging) can differentiate between discharged good batteries and bad batteries by way of a controlled voltage, short duration, high current, charging pulse which lends itself to an economical, compact, and easily used device. The testers of the prior art using some sort of charging cycle have consistently used a low current (less than 20 amps), long time (greater than 10 seconds), uncontrolled voltage charging cycle, as opposed to the proposal of the present invention which is to use high current (100–300 amps), short time (about 55 miliseconds) controlled voltage (about 15.0 volts) for a charging cycle. An alternative approach to the charging pulse consists of a high current pulse in which the current is controlled and the voltage is monitored.

DETAILED DESCRIPTION

Figure 1:
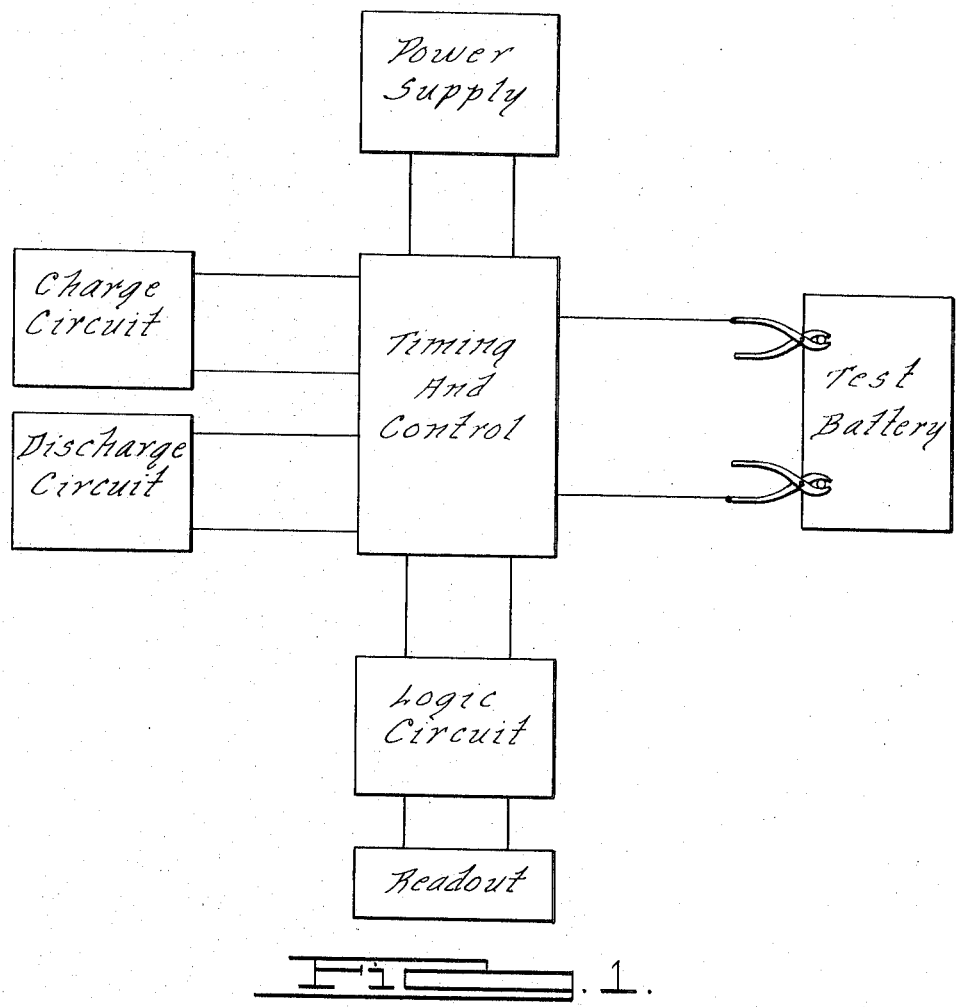
FIG. 1 is a block diagram describing an electrical apparatus for carrying out the method of this invention.

A metal electrode exposed to a particular solution will exhibit a characteristic potential, depending on the metal and the chemical character of the solution. The difference in potential between the metal and solution results in a separation of charges (ions) near the metal surface. For example, if the metal is negative with respect to the solution, then positive ions from the solution will accumulate next to the metal surface. This accumulation of charges on each side of the metal-solution interface has been likened to the situation which exists with a charged capacitor. When the potential of the metal changes, the quantity of charge at the interface changes. In the metal, a flow of electrons to or from the surface accompanies this change, while in the solution a re-arrangement of the ions near the interface occurs. The flow of electrons in the metal is called a non-faradaic current since no charge transfer occurs across the interface and thus no electrochemical reaction can take place. Non-faradaic current flow always accompanies a change in the potential of the metal. Any current flow associated with a chemical reaction is called faradaic current. Faradaic current flow may or may not occur, depending on the potential range, the identity of the metal, the chemical character of the solution, the temperature.

The quantity of charge which flows following a potential change depends upon the initial and final potentials, the chemical content of the solution, the identity of the metal and the actual exposed surface area of the metal. If the potential change takes place in a range where no electrochemical reaction occurs, the area under a current verses time curve or trace represents the total charge which flows to or from the electrode.

The most accurate method of changing the potential of an electrode is by applying a single square wave voltage pulse to the electrode. The non-faradaic current flow due to this pulse will have two peaks, the beginning peak should be equal to the ending peak since the electrode is returned to its original potential at the end of the pulse. The first peak is due to the current flow necessary to charge the electrode, going from low voltage to high voltage, and the second peak is due to the current flow necessary to discharge the electrode, going from the higher to the lower voltage. When a potential change is supplied to the electrode in a potential range where an electro-chemical reaction can occur, the shape of the current trace will be changed; the trace will not return to zero and the area under the two peaks is no longer equal. The area under the first peak is increased because the applied voltage pulse induces faradaic current along with non-faradaic current.

The double-peaked current flow resulting from a pulse charge is a measure of electrical double-layer capacitance; it can be quite sensitive to a number of variables. These include the identity of the metal, its microstructure, and a reaction product on the surface of the electrodes, the true areas on the electrode and the chemical nature of the solution to which the electrode is exposed. Many of these parameters are important in the charge and discharge of the lead acid battery. However, double-layer capacity measurements require a special third electrode and therefore would be impractical for routine use as a battery testing mechanism.

With this in mind, the current transient in a two electrode system was chosen as the desirable measurement which reflects the charging in both electrodes and is not related in any obvious manner to electrical double-layer capacitance. Nonetheless, the chemical and electrical properties, which affect the charge of both electrodes, influence the current transient, similar to electrical double-layer capacitance. Foremost, the invention used a high current charging at the end of which the current transient is measured to give a more reliable test of battery failure than known heretofore.

In addition, measurement of polarization of a battery during discharge is desirable to this invention (in addition to the current transient) for providing a useful clue to the general quality of a battery and thereby serve as rapid pre-sorting technique to cut short the full testing procedure for certain batteries. In addition, a discharge cycle is very desirable to act as a conditioning technique for the test battery since otherwise the battery may likely have a "surface charge" which would interfere with the current transient measurement.

A preferred method for this invention comprises:
1. Determine the initial voltage ($E_1$) of the test battery. If $E_1$ is less than 10.5 volts, the battery can be considered bad and the test is ended.
2. If $E_1$ is greater than 10.5 volts, discharge the test battery for a period of five seconds across a 0.03 ohm resistor. Immediately before the end of the discharge period, determine the voltage ($E_2$) and subtract $E_2$ from $E_1$ to render a determination of the electrode polarization.
3. If the polarization is less than a predetermined reference polarization value, the battery can be considered good and the test is ended. If the polarization value is greater than the predetermined reference polarization, allow the battery to rest for a period of approximately thirty seconds.
4. Then, force a sufficient charging current into the battery to polarize it to a pre-determined level, e.g. 15 volts, for a pre-determined period of time, e.g. 55 milliseconds. Immediately before the end of the charging period or pulse, measure the current ($i_1$) required to maintain the polarization at 15 volts. Compare ($i_1$) to a reference current value and if greater than the reference value, the battery can be considered good but discharged. If $i_1$ is less than the current reference value, the battery is deemed defective.

The block diagram of FIG. 1 shows a schematic embodiment of a mechanism to carry out the preferred method above. Both polarization and current transient measurements are combined to provide a rapid and reliable test mode regardless of the state-of-charge of the battery.

The circuit has a power supply which may be powered either from AC line voltage or from two 12 volt batteries connected in series. The battery test is controlled by the timing and control circuit. The initial battery voltage ($E_1$) is sensed by the logic circuit. If this voltage is less than 10.5 volts a readout of defective battery is provided. Alternatively, an initial battery voltage less than 10.5 volts can cause a readout of "charge and re-test" to be provided. If $E_1$ is greater than 10.5 volts, $E_1$ is stored by the logic circuit; however, if $E_1$ is greater than 13.0 volts, 13.0 volts is stored by the logic circuit. The test battery is next discharged for 5 seconds through a resistance of about 0.030 ohm. The battery voltage at the end of the discharge period ($E_2$) is sensed by the logic circuit and subtracted from $E_1$ which was stored earlier to obtain the battery polarization ($E_1-E_2$). The polarization is compared to a reference value by the logic circuit. If the polarization is less than the reference value a readout of "good and fully charged" is provided and the test is ended. If the polarization is greater than the reference value, the test battery is allowed to rest for a period of about thirty seconds. At the end of the rest period the battery is polarized by the charge circuit to 15 volts for 55 milliseconds. The parameter of interest is the current required to accomplish this polarization. This current ($i_1$) is monitored at the end of the charge pulse by the logic circuit, and compared to a reference value. If $i_1$ is greater than the reference value a readout of "good but needs charging" is provided. If $i1$ is less than the reference value a readout of "bad battery" is provided.

Figure 6:
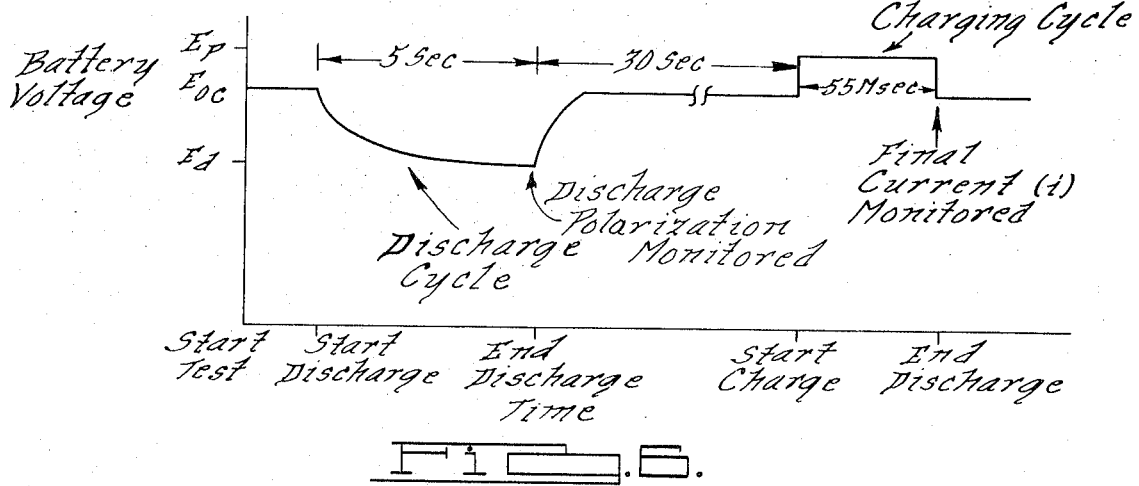

The battery voltage as a function of time during the test is shown in FIG. 6.

Figure 4:
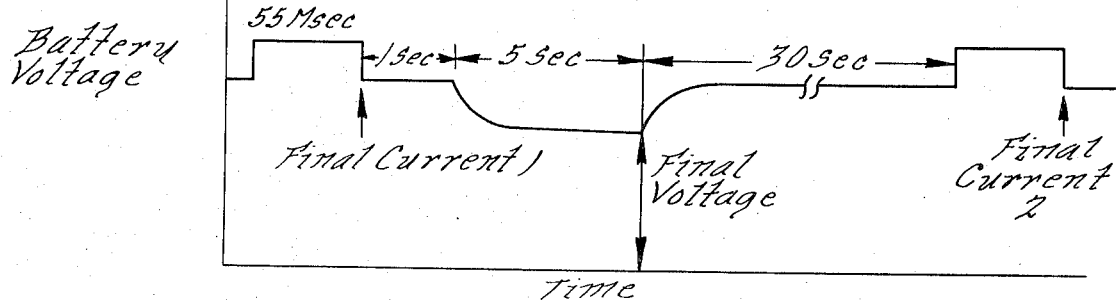
Figure 5:
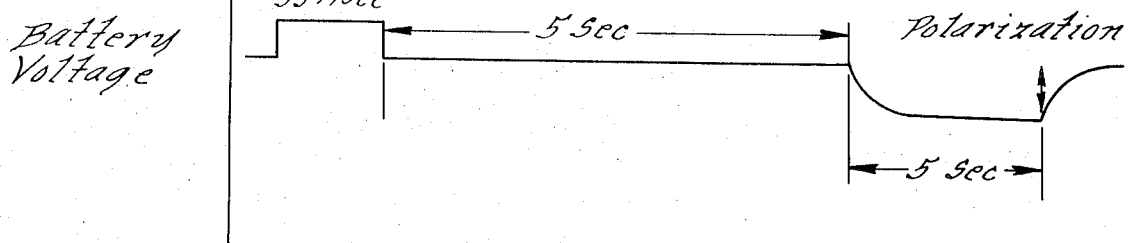
FIGS. 5–6 represent traces of battery voltage with time for method sequences utilizing polarization measurements and high current pulsing for current transient measurements.

Some method sequences (FIGS. 2–4) of this invention can employ exclusively one or more high current charging pulses and only incidentally some discharge in certain ones. Such method sequences represent this invention at one end of the spectrum of improvement over the prior art. The high current charging pulse has been discovered as a valuable tool in separating out bad batteries, but optimum reliability is obtained by method sequences utilizing polarization measurements in combination (FIGS. 5 and 6).

Figure 2:
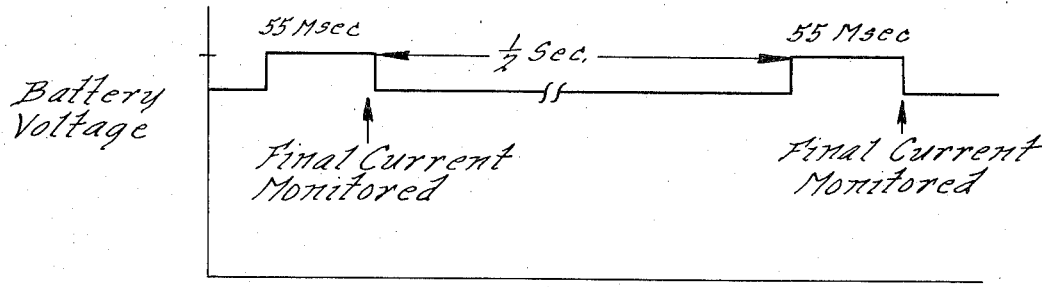

In FIG. 2, the test procedure consists of applying successive high current charging pulses with a brief (less than one second) separation to allow the test battery to rest. Each charging pulse is promoted for a 55 millisecond period and the final current at the end of each of the pulses was monitored (no polarization measurement). The criteria for a battery to pass this particular method mode is that the magnitude of the final current of the second current transient should be equal to or greater than the magnitude of the final current of the first current transient. Essentially, this method mode presumes a bad battery will have a tendency to retain the voltage polarization resulting from the first pulse and therefore will affect the second pulse. This presupposes that bad or defective batteries generally will remain polarized to some extent until the second pulse is applied. Therefore, hopefully less current is required to polarize the defective battery from this slightly polarized condition to the 15 volt level. The second current transient should therefore be lower than the first current transient, revealing that the battery is defective. Good batteries should not remain polarized for the half second period, and thus the second current transient should be the same as the first. For reasons not completely understood, it is possible that some defective batteries cannot retain their slight polarization for the one-half second. Therefore, on occasions, the testing may not be totally accurate but has shown to be operable and more effective than the prior art.

Figure 3:
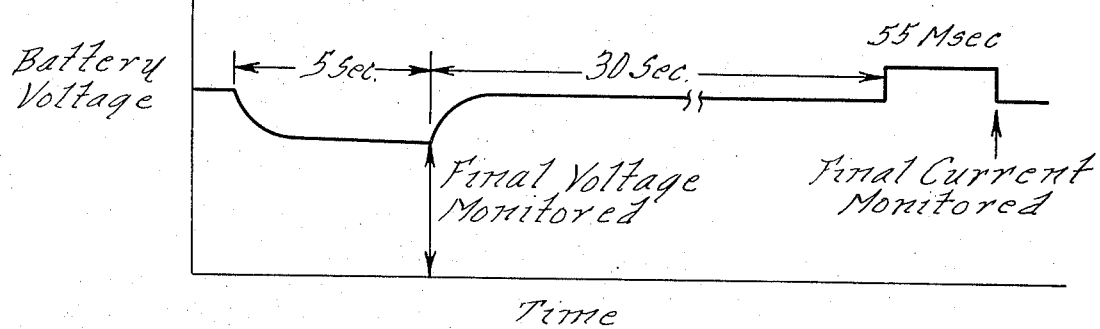
FIGS. 2–4 depict traces of voltage variation with time for different method sequences utilizing a high current charging pulse allowing for current transient measurement, the method sequences not employing polarization measurements.

As shown in FIG. 3, another test mode consisted of first discharging the test battery through a 0.0294 ohm resistor for five seconds, determining the voltage at the end of the dishcarge period (not a polarization measurement), then the final current of the current transient from a high current pulse is measured. The measured voltage and the final current were compared to reference values that were obtained by testing a large number of good batteries and evaluating their behavior. If the final voltage reading from the test battery was greater than the reference voltage, the battery was good. If the final voltage reading was less than the reference current for the battery to pass the test. If both the final voltage and the final current were below the threshhold values, the battery failed the test. However, it was determined that measuring solely the voltage at the end of the discharge period allowed some defective batteries to pass the test.

Still another test mode (FIG. 4) consisted of applying a high current charging pulse 1, measuring the final current of current transient monitored, then discharging the battery for five seconds through a 0.029 ohm resistor (monitoring the final voltage) delaying thirty seconds and then applying a high current charging pulse 2, and measuring the final current of the second current transient monitored. The monitoring of two current transients separated by monitoring of one final voltage discharge increased the accuracy, but on rare occasions a good battery may be tested as bad in error.

To obtain even better accuracy, the method mode of FIGS. 5 and 6 were developed, particularly that of FIG. 6. In FIG. 5, the mode consisted of applying a high current charging pulse (measuring the final current of current transient monitored), delaying five seconds and then discharging the battery for five seconds and monitoring, not the voltage, but the polarizatiton at the end of the discharge. The final current transient and polarization are compared to reference values. This tests as with the preferred embodiment, uses a rigorous discharge to separate out good, fully charged batteries and a current transient tests is used to separate good batteries which fail the discharge test from bad batteries which fail the discharge test.

The reverse sequence of the test mode is illustrated in FIG. 6 and represents the preferred embodiment as described earlier in connection with the preferred method. It optimally employs a polarization measurement prior to a high current charging pulse. There are several reasons why a defective battery will exhibit polarization much greater than that of a good battery. One reason is due to positive grid corrosion where an internal high resistance sets up a block to current flow and causes a large voltage drop; grid corrosion occurs when lead oxidizes to lead sulphate. When the voltage regulator setting is too high, such a chemical reversion may take place. Another reason may be iron contaminated water making up the electrolyte; the iron deposits on the electrode and inhibits recharging. Still another reason may be conversion of the lead sulfate in an electrode to an electrochemically inactive form.

I claim:

1. A method for testing a lead-acid battery, the steps comprising:
    a. subjecting a battery to both transient discharging and transient charging separated by a period of time to allow the battery to recover from either ion depletion or ion adsorption, said transient charging being carried out to obtain a predetermined level of polarization of the battery electrodes and the transient discharging being carried out to obtain a voltage change due to current flow to determine the polarization resulting from discharging,
    b. at a predetermined time before the end of said transient charging, measure the transient current,
    c. at a predetermined time before the end of the discharging period, measure the transient voltage, and
    d. compare the difference between the starting voltage of the battery and the measured transient voltage, and compare the diffference between the transient current and a predetermined reference current, whereby if both the voltage difference is above a predetermined polarization reference value and the transient current is less than said predetermined reference current value, the battery can be deemed defective.

2. A method for testing a multiple cell lead electrode and acid electrolyte battery having a known starting voltage, the steps comprising:
    a. discharge the battery for a time period sufficient to obtain a voltage change due to a discharging current flow through the lead-acid interface,
    b. determine a first transient voltage of the battery immediately before the end of the discharge period and subtract this first transient voltage from said starting voltage to determine if polarization of the battery electrodes resulting from said discharge is above a predetermined reference value, c. allow the battery electrodes to rest a period of time to recover ions depleted by said discharge,
d. terminate said rest period by forcing a charging current into said battery for a period of time to obtain a predetermined voltage change due to a current flow across the lead-acid interface and substantially devoid of electrochemical side reactions, and
e. immediately before the end of said charging period, measure the charging transient current required to obtain said predetermined voltage change, and
f. compare the difference between the charging transient current and a reference current, whereby if the charging transient current is less than a reference current value, the battery is deemed defective.

3. The method as in claim 2, in which the battery comprises six cells and the starting voltage is at least greater than 10 volts.

4. The method as in claim 3, in which the discharging period is restricted to about 5 seconds.

5. The method as in claim 3, in which the rest period is restricted to about 30 seconds.

6. The method as in claim 3, in which said charging period is restricted to about 55 milli-seconds and the predetermined voltage change from said charging results in a polarization level of about 15 volts.

7. The method of claim 4, in which discharging of said battery is carried out through a resistance of about 0.03 ohms.

\* \* \* \* \*